(12) United States Patent
Faigle et al.

(10) Patent No.: US 6,406,055 B1
(45) Date of Patent: Jun. 18, 2002

(54) AIR BAG MODULE WITH VENT

(75) Inventors: Ernst M. Faigle, Dryden; Tracy S. Sparks, Attica, both of MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 0 days.

(21) Appl. No.: 09/782,332

(22) Filed: Feb. 13, 2001

(51) Int. Cl.[7] .................................. B60R 21/26
(52) U.S. Cl. ............ 280/728.2; 280/735; 280/736; 280/739
(58) Field of Search ................... 280/739, 736, 280/742, 728.2, 735

(56) References Cited

U.S. PATENT DOCUMENTS

| | | |
|---|---|---|
| 5,234,229 A | 8/1993 | Gordon |
| 5,366,242 A * | 11/1994 | Faigle et al. ............... 280/739 |
| 5,695,214 A | 12/1997 | Faigle et al. |
| 5,743,558 A * | 4/1998 | Seymour .................... 280/739 |
| 5,799,974 A | 9/1998 | Honda |
| 5,853,192 A * | 12/1998 | Sikorski et al. ............. 280/739 |
| 6,082,765 A | 7/2000 | Bowers et al. |

* cited by examiner

Primary Examiner—Peter English
(74) Attorney, Agent, or Firm—Tarolli, Sundheim, Covell, Tummino & Szabo L.L.P.

(57) ABSTRACT

A vehicle occupant protection apparatus (10) comprises an inflatable vehicle occupant protection device (12) and an actuatable inflator (14). A retainer (40) is connected with the protection device (12). The retainer (40) has a fixed portion (46) and a movable portion (48). The movable portion (48) is movable between a first condition and a second condition to vent inflation fluid from the protection device (12). The apparatus (10) includes an electrically energizable mechanism (80) to release the movable portion (48) of the retainer (40) for movement from the first condition to the second condition. The apparatus (10) also includes vehicle electric circuitry (120) including a sensor (132) for sensing at least one occupant condition or vehicle condition and a controller (130) responsive to the sensor for controlling the electrically energizable mechanism (80).

11 Claims, 3 Drawing Sheets

AIR BAG MODULE WITH VENT

BACKGROUND OF THE INVENTION

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the air bag.

DESCRIPTION OF RELATED ART

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant protection apparatus comprising an inflatable vehicle occupant protection device having a deflated condition and an inflated condition for helping to protect a vehicle occupant. An inflator is actuatable to provide inflation fluid to inflate the inflatable device.

A retainer is connected with the protection device. The retainer has a fixed portion and a movable portion. The movable portion is movable between a first condition and a second condition to vent inflation fluid from the protection device. The apparatus includes an electrically energizable mechanism to release the movable portion of the retainer for movement from the first condition to the second condition. The apparatus also includes vehicle electric circuitry including a sensor for sensing at least one occupant condition or vehicle condition and a controller responsive to the sensor for controlling the electrically energizable mechanism.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the inflating air bag.

Figure 1:
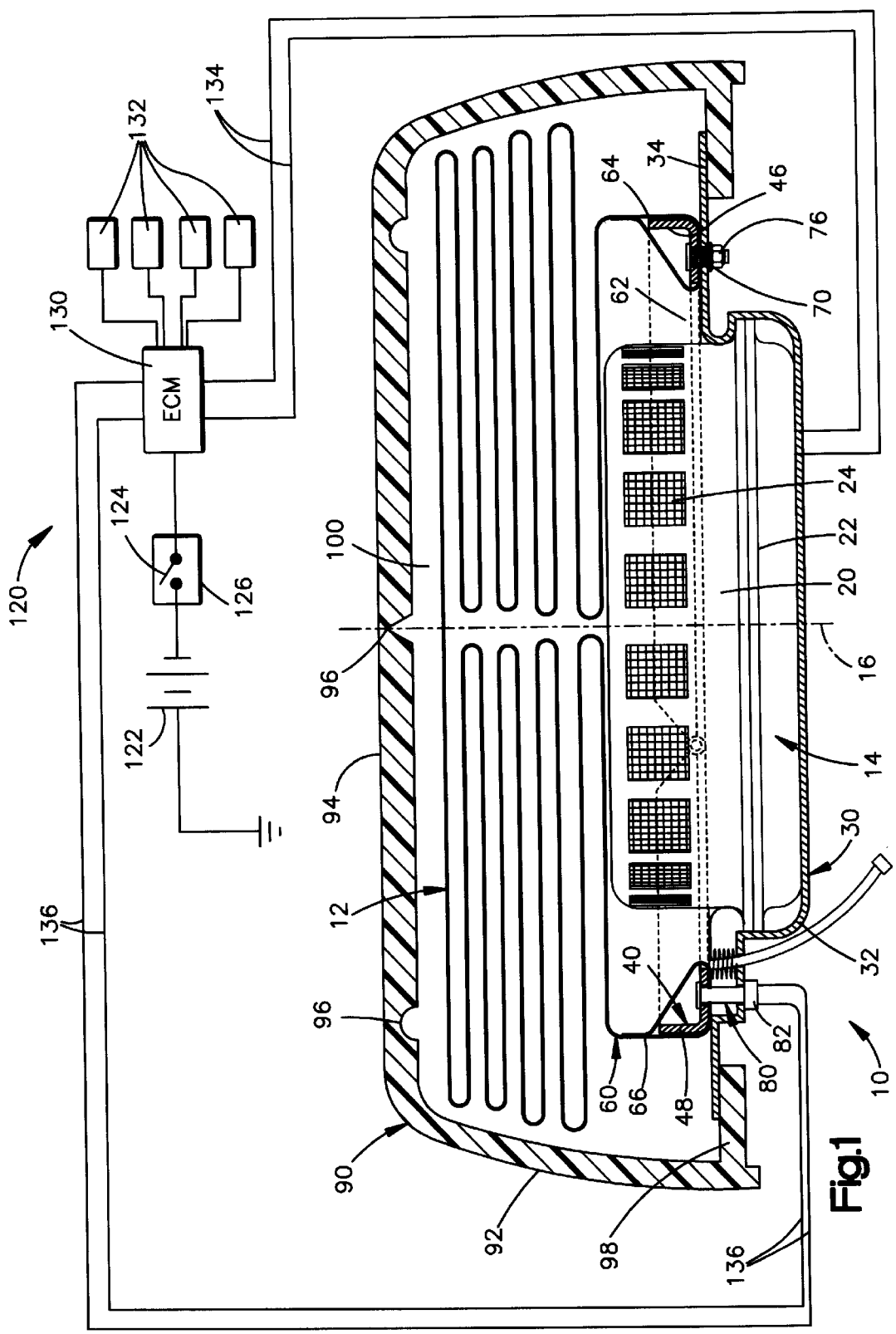
FIG. 1 is a schematic illustration, partially in section, of a vehicle occupant protection apparatus constructed in accordance with a first embodiment of the present invention.

As representative of the present invention, FIG. 1 illustrates a vehicle occupant protection apparatus 10 that is constructed in accordance with a first embodiment of the invention. The apparatus 10 includes an inflatable vehicle occupant protection device 12 of the type commonly known as an air bag. Other occupant protection devices that can be used in accordance with the invention include, for example, inflatable knee bolsters, inflatable headliners, inflatable side curtains, knee bolsters actuatable by air bags, and seat belt pretensioners.

The apparatus 10 also includes an inflator 14. The inflator 14 comprises a source of inflation fluid for inflating the air bag 12. As known in the art, the inflator 14 may contain an ignitable gas-generating material, which, when ignited, rapidly generates a large volume of gas. The inflator 14 may alternatively contain a stored quantity of pressurized inflation fluid, or a combination of pressurized inflation fluid and ignitable material for heating the inflation fluid.

The inflator 14 illustrated in the drawings has a cylindrical configuration centered on an axis 16. The inflator 14 could have a configuration other than the cylindrical configuration illustrated in the drawings. The inflator 14 has a main body portion 20 and an annular mounting flange 22. The main body portion 20 includes a plurality of inflation fluid outlets 24 through which inflation fluid is directed upon actuation of the inflator 14.

The apparatus 10 also includes a mounting plate 30. The mounting plate 30 is a structure that supports the inflator 14 and the air bag 12 on the vehicle. In the illustrated embodiment, the mounting plate 30 has a generally circular configuration. A central portion 32 of the mounting plate 30 extends around the main body portion 20 and mounting flange 22 of the inflator 14, and supports the inflator. A peripheral portion 34 of the mounting plate 30 extends radially outward from the central portion 32 and has a generally planar configuration. The peripheral portion 34 of the mounting plate 30 is secured to the vehicle in a manner not shown, and thus supports the inflator 14 on the vehicle.

Figure 3:
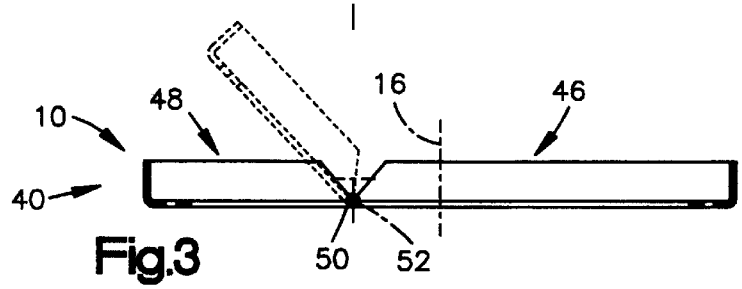
FIG. 3 is a sectional view of the retainer of FIG. 2, taken along line 3—3 of FIG. 2.

The apparatus 10 includes a retaining ring, or retainer, 40 that is supported on the mounting plate 30. The retainer 40 is a device that is connected with the air bag 12 and that retains, or secures, the air bag in the apparatus 10. The retainer 40 has an endless, ring-shaped configuration extending around the main body portion 20 of the inflator 14. The retainer 40 has an L-shaped cross-sectional configuration as seen in FIGS. 1 and 3.

The retainer has a planar first portion, or fixed portion, 46 and a planar second portion, or movable portion 48. The fixed portion 46 of the retainer 40 comprises one sector of the circular retainer, and the movable portion 48 of the retainer comprises the remainder of the retainer. In the illustrated embodiment, the fixed portion 46 of the retainer 40 subtends an angle of approximately 220 degrees, and the movable portion 48 of the retainer subtends an angle of approximately 140 degrees. The fixed portion 46 and movable portion 48 could have different relative dimensions.

The fixed portion 46 of the retainer 40 is joined to the movable-portion 48 of the retainer with a predetermined weakened portion that comprises two hinges 50 with hinge pins. The hinges 50 support the movable portion 48 of the retainer 40 for movement, relative to the fixed portion 46, about an axis 52. The axis 52 extends through the two hinges 50. In the illustrated embodiment, the axis 52 does not extend through the central axis 16 of the inflator 14, although it might in another embodiment. The predetermined weakened portion could, alternatively, have a form other than the hinges 50, for example a notch or notches in the material of the retainer 40.

A mouth portion 60 of the air bag 12 is secured to the retainer 40 by wrapping around the retainer and being sewn to itself as shown in FIG. 1. The mouth portion 60 of the air bag 12 defines an inflation fluid opening 62 of the air bag, for receiving inflation fluid from the inflator 14. A first part 64 of the mouth portion 60 of the air bag 12 is wrapped and sewn around the fixed portion 46 of the retainer 40. A second part 66 of the mouth portion 60 of the air bag 12 is wrapped and sewn around, and is movable with, the movable portion 48 of the retainer 40.

Figure 2:
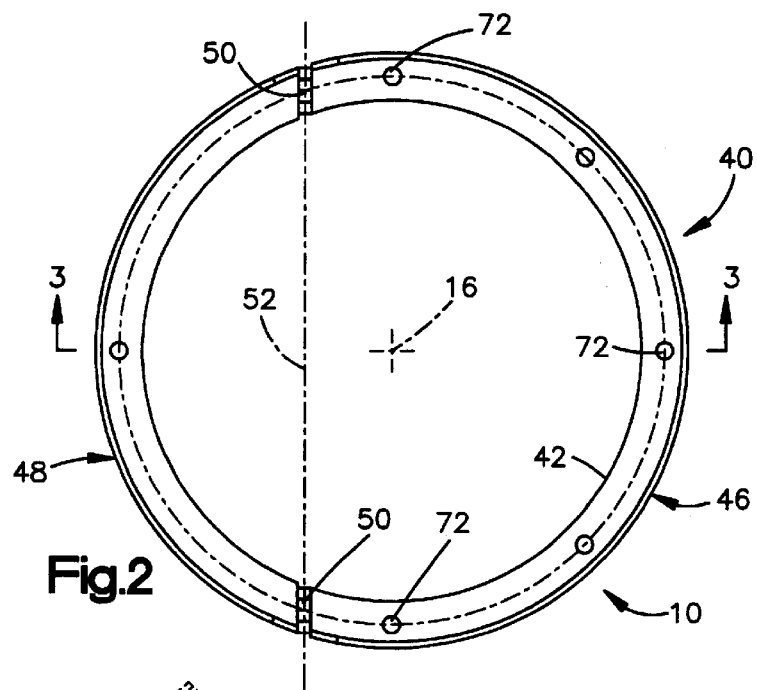
FIG. 2 is a plan view of a retainer that forms part of the apparatus of FIG. 1.

The apparatus 10 includes structure for connecting the retainer 40 and the air bag 12 with the mounting plate 30. In the illustrated embodiment, the structure comprises a plurality of fasteners in the form of bolts 70. The bolts 70 extend through openings 72 (FIG. 2) in the fixed portion 46 of the retainer 40 and through corresponding openings in the mounting plate 30. Nuts 76 are screwed on the bolts 70 to secure the fixed portion 46 of the retainer 40, and thereby the first part 64 of the mouth portion 60 of the air bag 12, to the mounting plate 30.

When the fixed portion 46 of the retainer 40 is secured to the mounting plate 30 with the nuts 76 and bolts 70, the movable portion 48 of the retainer is supported on the mounting plate for pivotal movement relative to the mounting plate about the axis 52. The apparatus 10 includes a release mechanism 80 for releasably connecting the movable portion 48 of the retainer 40 to the mounting plate 30. In the illustrated embodiment, the release mechanism 80 includes a single explosive bolt shown schematically at 82, although more or fewer bolts could be provided, or a different type of mechanism could be provided.

When the explosive bolt 82 is in an unactuated condition as shown in FIG. 1, the movable portion 48 of the retainer 40 is clamped to the mounting plate 30 by the explosive bolt 82. The explosive bolt 82 prevents the movable portion 48 of the retainer 40, and the second part 66 of the mouth portion 60 of the air bag 12, from pivoting out of the plane of the fixed portion 46 of the retainer, that is, in an upward direction as viewed in FIG. 1.

The inflator 14, the air bag 12, and the retainer 40 are, in the illustrated embodiment, enclosed in a cover 90. The cover 90 is preferably made from plastic and includes a circular side wall 92 and a top wall 94. The top wall 94 has predetermined weakened portions 96. At one or more of the weakened portions 96, the top wall 94 is rupturable. At other weakened portions 96, the top wall 94 is hinged to the side wall 92. A mounting flange 98 of the cover 90 extends inwardly from the side wall 92 and is secured to the mounting plate 30. The top wall 94 and side wall 92 of the cover 90, together with the mounting plate 30 and the inflator 14, define a chamber 100 in the apparatus 10. The inflation fluid outlets 24 of the inflator 14 are located in the chamber 100.

The apparatus 10 includes vehicle electric circuitry indicated schematically at 120 (FIG. 1). The vehicle electric circuitry 120 controls the operation of the inflator 14 and the release mechanism 80. The vehicle electric circuitry 120 includes a power source 122, which is preferably the vehicle battery and/or a capacitor, and a normally open switch 124. The switch 124 is part of a collision sensor 126, which senses a condition indicating the occurrence of a vehicle collision. The collision-indicating condition may comprise, for example, sudden vehicle deceleration caused by a collision. The vehicle electric circuitry 120 further includes an electronic control module, or controller, 130 for controlling the operation of the vehicle electric circuitry 120, and a sensor assembly 132.

The sensor assembly 132 includes one or more sensors that generate one or more control signals useful in determining whether to inflate the air bag 12 with maximum speed and force when a vehicle collision is sensed. For example, the sensor assembly 132 may include an occupant position sensor that generates a control signal indicative of the position of a vehicle occupant in the interior of a vehicle. The sensor assembly 132 may also include a buckle switch for generating a control signal indicative of a buckled or unbuckled condition of a seat buckle assembly of the vehicle. The sensor assembly 132 may also include a sensor that senses the presence of a rearward-facing child seat, a weight sensor, a belt tension sensor, an occupant size sensor, a module temperature sensor, or a crash severity sensor.

If a collision-indicating condition sensed by the collision sensor 126 is above a predetermined threshold, it indicates the occurrence of a collision for which inflation of the air bag 12 is desired to help protect the occupant of the vehicle. The switch 124 in the collision sensor 126 closes and the control module 130 transmits an actuation signal to the inflator 14 over lead wires 134. When the inflator 14 is actuated, it emits a large volume of inflation fluid into the chamber 100.

Figure 4:
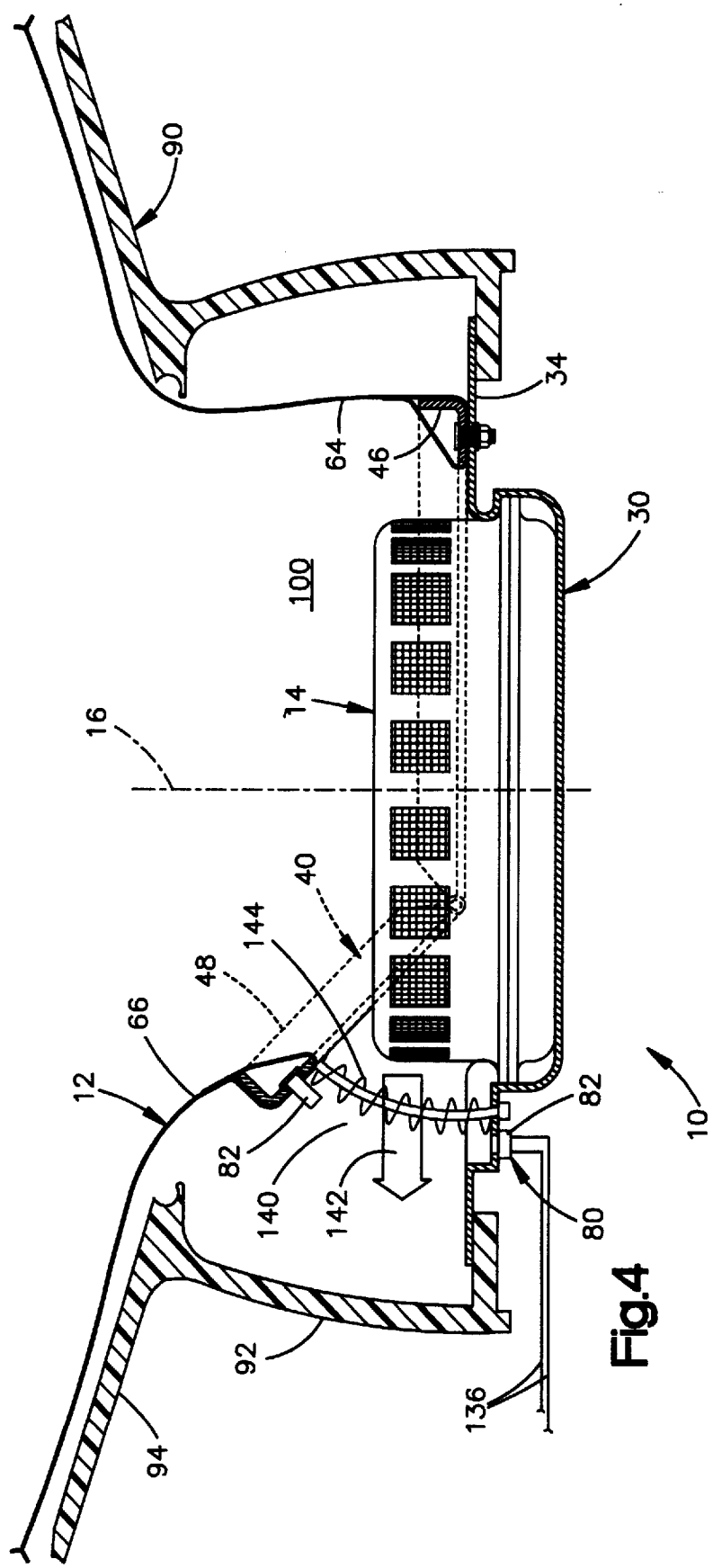
FIG. 4 is a view similar to FIG. 1 showing the apparatus of FIG. 1 in an actuated condition.

The inflation fluid flows into the inflation fluid opening 62 of the air bag 12. The inflation fluid begins to inflate the air bag 12, which moves rapidly and forcefully outward against the top wall 94 of the cover 90. The cover 90 opens and the air bag 12 inflates into a position to help protect the vehicle occupant, as shown in FIG. 4.

Upon such an occurrence of a condition requiring actuation of the inflator 14, the control module 130 receives the control signals from the sensor assembly 132. The control module 130 determines, on the basis of those signals, whether it is desirable to actuate the release mechanism 80. This determination, as well as the actuating of the release mechanism 80 itself, can be made prior to actuation of the inflator 14, or at the same time as actuation of the inflator, or after actuation of the inflator.

The control signals from the sensor assembly 132 may indicate a condition in which it is desirable that the air bag 12 be inflated with maximum force and speed. If the control module 130 receives signals indicating such a condition, the control module determines that the release mechanism 80 should remain in the unactuated condition. The explosive bolt 82 is not energized by the control module 130. The movable portion 48 of the retainer 40 is not released for movement away from the mounting plate 30, and remains in the position shown in FIG. 1, overlying the mounting plate. As a result, all the inflation fluid from the inflator 14 is directed into the inflation fluid opening 62 of the air bag 12, and the air bag inflates with maximum speed and force.

On the other hand, one or more of the control signals from the sensor mechanism 132 may indicate a condition in which it is desirable not to inflate the air bag 12 with maximum speed and force. If the control module 130 receives a signal indicative of such a condition, the control module determines that the release mechanism 80 should be actuated. A control signal is transmitted from the control module 130, through lead wires 136, to the explosive bolt 82 of the release mechanism 80.

The explosive bolt 82 is electrically energized and fractures as shown schematically in FIG. 4. The movable portion 48 of the retainer 40 is released for movement away from the mounting plate 30. The fixed portion 46 of the retainer 40 remains secured to the mounting plate 30, along with the first part 64 of the mouth portion 60 of the air bag 12.

The force of the inflating air bag 12, which is moving away from the mounting plate 30, acts through the second part 66 of the mouth portion 60 of the air bag 12 and pulls the movable portion 48 of the retainer 40 away from the mounting plate 30. The second part 66 of the mouth portion 60 of the air bag 12 also moves away from the mounting plate 30. A gap 140 is formed between the mounting plate 30 and the movable portion 48 of the retainer 40. As a result, inflation fluid from the inflator 14 can flow out of the chamber 100 through the gap 140, as indicated by the arrow 142.

The inflation fluid that flows out of the chamber 100 through the gap 140 does not flow into the air bag 12 to inflate the air bag. As a result, the amount of inflation fluid flowing into the air bag 12, or the pressure of the inflation fluid, is reduced as compared to the amount or pressure of inflation fluid flowing into the air bag when the release mechanism 80 remains unactuated. This change in the flow of inflation fluid can help to reduce or control the speed and force of deployment of the air bag 12.

The apparatus 10 may include structure for helping to move the movable portion 48 of the retainer 40 away from the mounting plate 30 when the release mechanism 80 is actuated. For example, the apparatus 10 may include one or more springs located between the retainer 40 and the mounting plate 30, as indicated schematically at 144 (FIG. 4). The springs 144 can help to move the movable portion 48 of the retainer 40 away from the mounting plate 30 when the release mechanism 80 is actuated.

Figure 5:
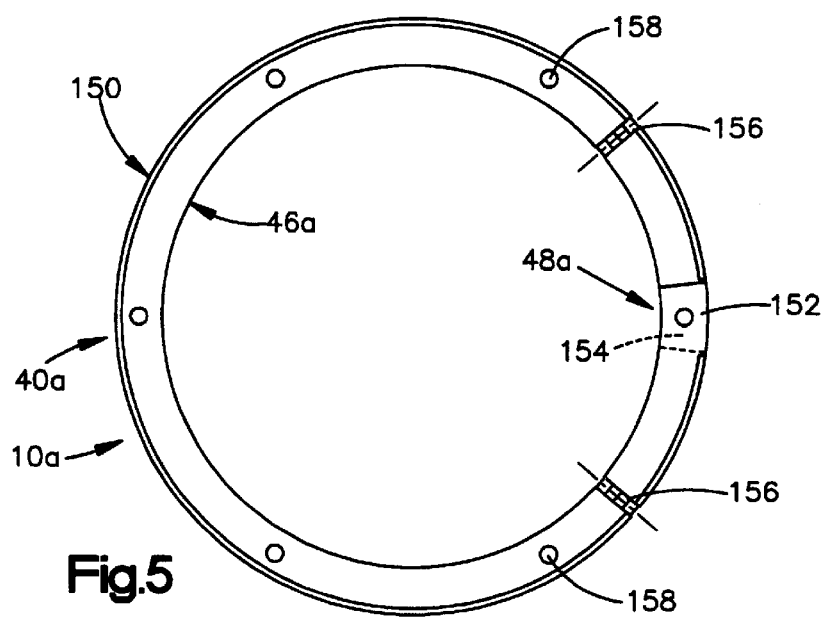
FIG. 5 is a plan view of a retainer that is constructed in accordance with a second embodiment of the present invention.

FIG. 5 illustrates a retainer 40a that forms a part of a vehicle occupant protection apparatus 10a constructed in accordance with a second embodiment of the invention. The retainer 40a is made from a single piece of material, preferably steel, that has a ring-shaped configuration with a circumferential extent of approximately 370 degrees. The retainer 40a has a generally planar main body portion 150 and two end portions 152 and 154 that are joined to the main body portion by hinges 156. The first end portion 152 of the retainer 40a at least partially overlaps the second end portion 154 of the retainer.

The main body portion 150 of the retainer 40a forms a fixed portion 46a of the retainer. The fixed portion 46a of the retainer 40a can be secured to another portion of the apparatus 10a with fasteners (not shown) extending through mounting openings 158. The first and second end portions 152 and 154 of the retainer 40a form a movable portion 48a of the retainer. The movable portion 48a of the retainer 40a is secured to the other parts of the apparatus 10a with a release mechanism (not shown), such as the release mechanism 80. For example, the release mechanism 80 could extend through the overlapping parts of the first and second end portions 152 and 154 of the retainer 40a to secure the end portions to other parts of the apparatus 10a.

A mouth portion of an air bag (not shown) is connected with the retainer 40a. When the air bag is inflated, and the release mechanism is released, the force of the inflating air bag causes the end portions 152 and 154 of the retainer 40a to pivot out of the plane of the main body portion 150. A gap is formed adjacent the end portions 152 and 154 of the retainer 40a, through which inflation fluid can flow to vent the air bag.

From the above description of the invention, those skilled in the art will perceive improvements, changes and modifications in the invention. For example, one or more of the hinges in the retainer could be replaced by a predetermined weakened portion of the retainer that deforms when the release mechanism is released. Such improvements, changes and modifications within the skill of the art are intended to be covered by the appended claims.

Having described the invention, we claim:

1. A vehicle occupant protection apparatus comprising:
   an inflatable vehicle occupant protection device having a deflated condition and an inflated condition for helping to protect a vehicle occupant;
   an inflator actuatable to provide inflation fluid to inflate said inflatable device;
   a mounting member for supporting said inflator and said protection device on a vehicle;
   a retainer connecting said protection device to said mounting member;
   said retainer having a fixed portion and a movable portion, said movable portion being movable between a first condition and a second condition to vent inflation fluid from said protection device;
   an electrically energizable mechanism to release said movable portion of said retainer for movement from the first condition to the second condition; and
   vehicle electric circuitry including a sensor for sensing at least one occupant condition or vehicle condition and a controller responsive to said sensor for controlling said electrically energizable mechanism.

2. An apparatus as set forth in claim 1 wherein said fixed portion of said retainer is connected with said movable portion of said retainer by at least one hinge.

3. An apparatus as set forth in claim 1 wherein said movable portion of said retainer is supported for movement between the first and second conditions in response to force applied by a spring.

4. An apparatus as set forth in claim 1 wherein said at least one sensor is an occupant position sensor or a buckle switch or a sensor that senses the presence of a rearward-facing child seat or a weight sensor or a belt tension sensor or an occupant size sensor or a module temperature sensor or a crash severity sensor.

5. An apparatus as set forth in claim 1, wherein said release mechanism comprises an explosive bolt.

6. An apparatus as set forth in claim 1, wherein said retainer comprises a retaining ring.

7. A vehicle occupant protection apparatus comprising:
   an inflatable vehicle occupant protection device having a deflated condition and an inflated condition for helping to protect a vehicle occupant;
   an inflator actuatable to provide inflation fluid to inflate said inflatable device;
   a mounting member for supporting said inflator and said protection device on a vehicle;
   a retainer connecting said protection device to said mounting member, said retainer having a first portion and a second portion connected by a predetermined weakened portion, said second portion being movable between a first condition and a second condition to vent inflation fluid from said protection device;

an electrically energizable mechanism to release said second portion of said retainer for movement from the first condition to the second condition; and vehicle electric circuitry including a sensor for sensing at least one occupant condition or vehicle condition and a controller responsive to said sensor for controlling said electrically energizable mechanism.

8. An apparatus as set forth in claim 7 wherein said predetermined weakened portion comprises at least one hinge.

9. A vehicle occupant protection apparatus comprising:

an inflatable vehicle occupant protection device having a deflated condition and an inflated condition for helping to protect a vehicle occupant;

an inflator actuatable to provide inflation fluid to inflate said inflatable device;

a retainer connected with said protection device;

said retainer having a fixed portion and a movable portion, said movable portion being movable between a first condition and a second condition to vent inflation fluid from said protection device;

an electrically energizable mechanism to release said movable portion of said retainer for movement from the first condition to the second condition; and vehicle electric circuitry including a sensor for sensing at least one occupant condition or vehicle condition and a controller responsive to said sensor for controlling said electrically energizable mechanism;

said retainer having first and second end portions, and wherein said movable portion of said retainer comprises said first and second end portions interconnected by said release mechanism in an overlapping condition.

10. A vehicle occupant protection apparatus comprising:

an inflatable vehicle occupant protection device having a deflated condition and an inflated condition for helping to protect a vehicle occupant;

an inflator actuatable to provide inflation fluid to inflate said inflatable device;

a retainer connected with said protection device;

said retainer having a fixed portion and a movable portion, said movable portion being movable between a first condition and a second condition to vent inflation fluid from said protection device;

an electrically energizable mechanism to release said movable portion of said retainer for movement from the first condition to the second condition; and vehicle electric circuitry including a sensor for sensing at least one occupant condition or vehicle condition and a controller responsive to said sensor for controlling said electrically energizable mechanism;

said retainer having an endless configuration and said movable portion of said retainer comprising a single segment of said retainer held in the first condition by said release mechanism.

11. A vehicle occupant protection apparatus comprising:

an inflatable vehicle occupant protection device having a deflated condition and an inflated condition for helping to protect a vehicle occupant;

an inflator actuatable to provide inflation fluid to inflate said inflatable device;

a retainer connected with said protection device;

said retainer having a fixed portion and a movable portion, said movable portion being movable between a first condition and a second condition to vent inflation fluid from said protection device;

an electrically energizable mechanism to release said movable portion of said retainer for movement from the first condition to the second condition; and vehicle electric circuitry including a sensor for sensing at least one occupant condition or vehicle condition and a controller responsive to said sensor for controlling said electrically energizable mechanism;

said movable portion of said retainer being supported for movement between the first and second conditions in response to force applied to said retainer by said protection device when said protection device is inflating.

* * * * *